United States Patent [19]

Tanaka

[11] Patent Number: 5,172,405
[45] Date of Patent: Dec. 15, 1992

[54] ANSWERING MACHINE ARRANGEMENT

[75] Inventor: Shinichi Tanaka, Nagaokakyo, Japan

[73] Assignee: Murata Kikai Kabushiki Kaisha, Kyoto, Japan

[21] Appl. No.: 564,634

[22] Filed: Aug. 8, 1990

[30] Foreign Application Priority Data

Aug. 11, 1989 [JP] Japan .................. 1-94541[U]

[51] Int. Cl.$^5$ .................................................. H04M 1/64
[52] U.S. Cl. .................................... 379/70; 379/67; 379/77; 369/29
[58] Field of Search ................. 379/67, 68, 69, 70, 379/73, 74, 83, 77, 80; 369/29

[56] References Cited

U.S. PATENT DOCUMENTS

| | | | |
|---|---|---|---|
| 3,798,380 | 3/1974 | Hashi et al. | 379/77 |
| 4,427,980 | 1/1984 | Fennell et al. | 379/67 |
| 4,469,919 | 9/1984 | Nakamura et al. | 379/77 |
| 4,588,857 | 5/1986 | Arsem | 379/80 X |
| 4,802,202 | 1/1989 | Takahashi et al. | 379/67 |

Primary Examiner—Stuart S. Levy
Assistant Examiner—Joseph A. Rhoa
Attorney, Agent, or Firm—Spensley Horn Jubas & Lubitz

[57] ABSTRACT

An answering machine arrangement includes a recording medium for recording a message from outside with a passcode being previously recorded in a particular area of the recording medium, a device for reading the passcode from the recording medium when a "play" button is depressed and a controller for judging if the passcode read from the recording medium is identical to a passcode input by an operator, such that the message recorded in the recording medium is played back only when these passcodes are identical to each other. The secrecy of the recording message is maintained. Upon changing the passcode, all messages are erased automatically.

10 Claims, 6 Drawing Sheets

PASSCODE SETTING/CHANGING

RECORDING MODE

ANSWERING MACHINE ARRANGEMENT

BACKGROUND OF THE INVENTION

1. Technical Field

The present invention relates to an arrangement including an answering machine and particularly to an arrangement which maintains a secrecy of message recorded by the answering machine.

2. Background Art

A conventional answering machine has a tape for respsonse to a calling person and a tape for recording a message from the calling person. When there is a telephone call from outside, first, the resposne tape is activated to give a previously recorded message to the calling person, and then the recording tape is activated to record a message from the calling person.

With the conventional answering machine, everyone can hear the recorded message by depressing a "PLAY" button. Therefore, there is no secrecy to the recorded message.

In order to prevent a leakage of the message, a secret-maintaining device might be attached to the answering machine. The secret-maintaining device assigns an ID (identification) to the answering machine and an operator can hear the message recorded in the answering machine only when the operator inputs the ID. However, such a device cannot provide an ideal relation between the recorded message and the secret maintenace, i.e., if the message was recorded into an answering machine of a third party, the secrecy of the message would no longer maintained.

SUMMARY OF THE INVENTION

One object of the present invention is to provide an arrangement including an answering machine whose recording tape and telephone set serve in combination as the secrecy-maintaining device.

According to one aspect of the present invention, there is provided an answering machine arrangement, characterized in that the arrangement comprises: a recording medium for recording a message from outside with a passcode being recorded in a particular area of the recording medium; means for reading the passcode from the recording medium only when a "play" mode is selected; and means for judging if the passcode read from the recording medium is identical to a passcode input by an operator, such that the message recorded in the recording medium is played back only when these passcodes are identical to each other.

The recording medium may be a recording tape. A passcode is previously recorded in the tape. The operator inputs a passcode when he wants to hear the recorded message. Even if the "PLAY" button is depressed, the recorded message is not played back unless the input passcode corresponds to the previously recorded passcode. Therefore, the secrecy of the recorded message is maintained even if the message from outside is accidentally recorded into someone's answering machine, as far as the ansewring machines have the same passcode-check function.

According to the answering machine arrangement of the present invention, the message from outside is always recorded into the answering machine, regardless of the passcode input to the arrangement, but the play back of the recorded message is allowed only when the passcode input by the operator is identical to the passcode previously input on the tape.

DESCRIPTION OF THE PREFERRED EMBODIMENTS

Figure 1:
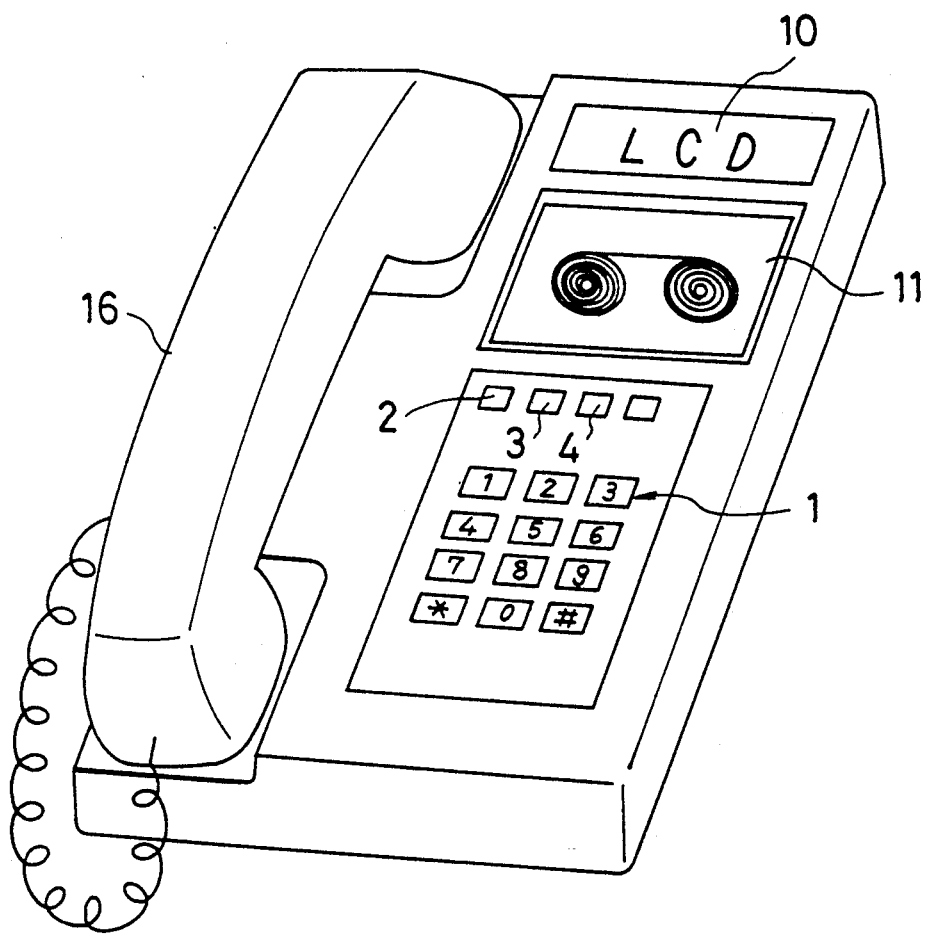
FIG. 1 shows an overall view of an answering machine arrangement according to the present invention.

Referring to FIG. 1 of the accompanying drawings, which shows a perspective view of an answering machine arrangement of the present invention, there are provided on a top panel of a telephone set a ten-key set 1, a passcode setting/changing key 2, a tape play-back key 3, an answering function setting key 4, an LCD (Liquid Crystal Display) 10 and a cassette tape as a recording medium for recording a message from outside. Numeral 16 designates a hand set. A tape recording a response message is not seen in FIG. 1 but incorporated in the answering machine arrangement.

Figure 2:
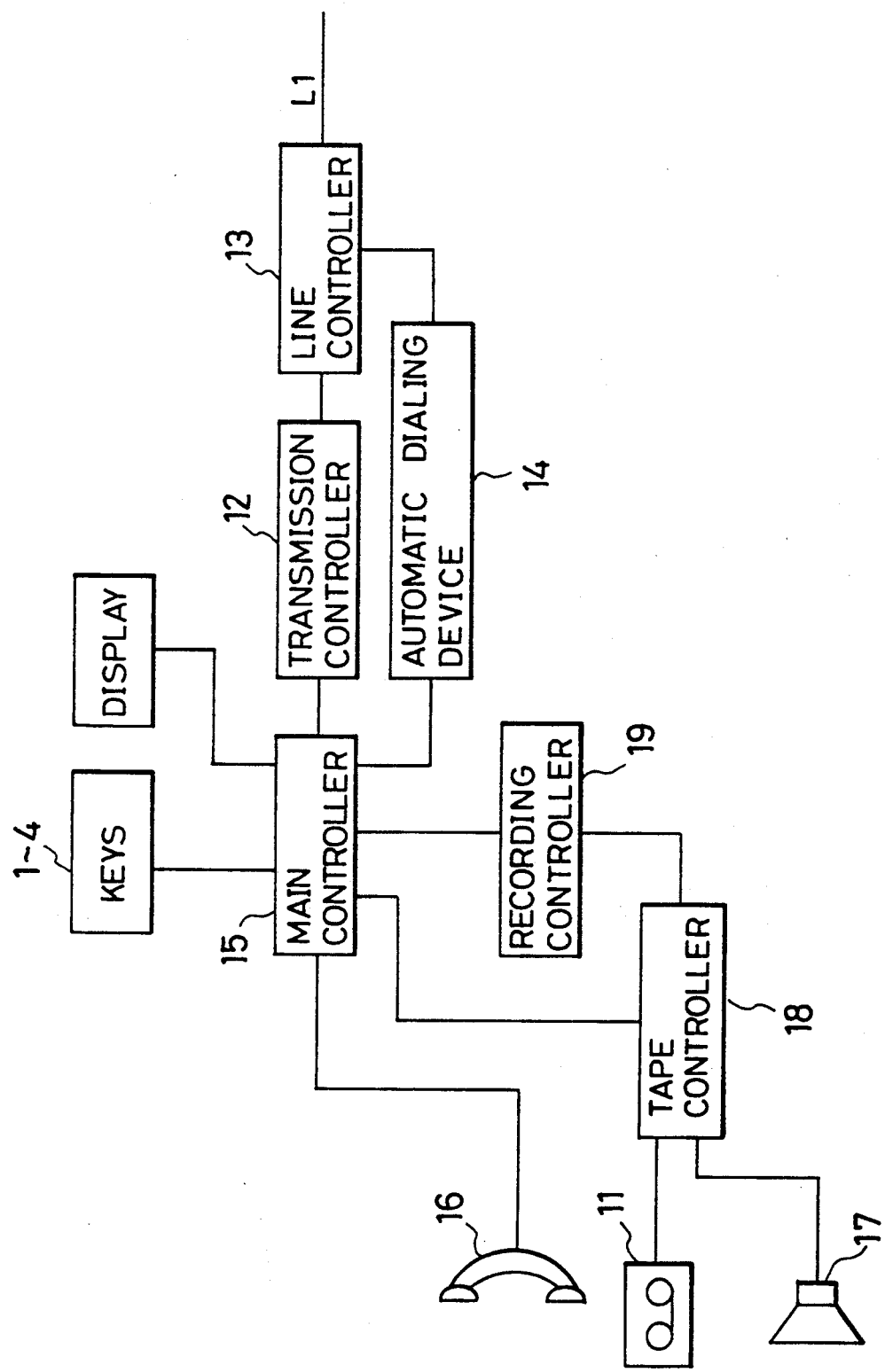
FIG. 2 shows a block diagram of the arrangement of FIG. 1.

FIG. 2 shows a block diagram of the answering machine arrangement of FIG. 1. In FIG. 2, numeral 12 denotes a transmission controller for control of communication protocol, 13 denotes a line controller for a telephone line L1, 14 denotes an automatic dialing device, 15 denotes a main controller, 17 denotes a speaker, 18 denotes a tape controller and 19 denotes a recording controller. The tape controller 18 is a circuit for controlling a recording and a play-back into and from the cassette tape 11. The recording controller 19 is a circuit for a control of detection of a passcode recorded in the cassette tape 11 and a control of a function of skipping-to-a-front-of-the-tape (called "skipping-to-the-tape-front-function").

Figure 3:
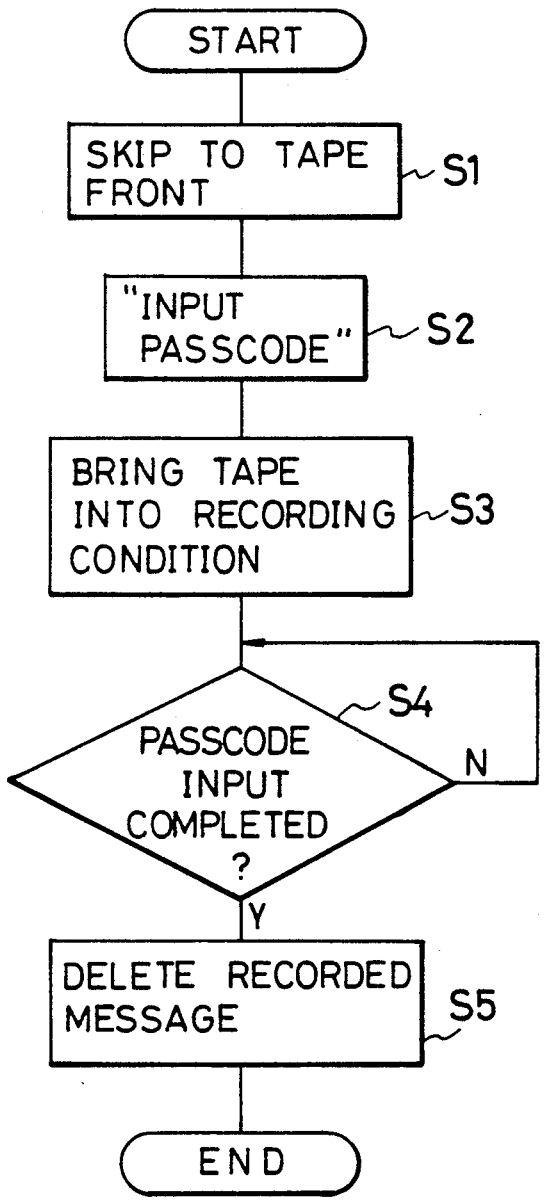
FIGS. 3 to 5 are flowcharts for the arrangement of FIG. 1 respectively.
Figure 6:
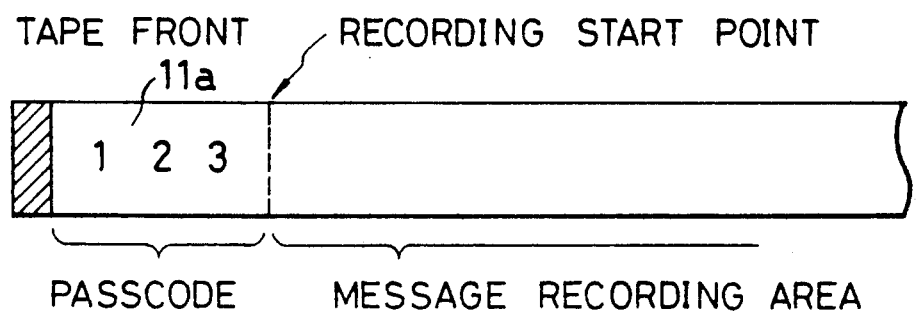
FIG. 6 illustrates a front portion of a recorded message on a recording tape.

The setting of the passcode, the setting of an answering mode and the setting of the play-back mode are controlled by the main controller 15. When an operator wants to input the passcode to a new cassette tape, or change the passcode recorded in the cassette tape, the operator first depresses the passcode setting/changing key 2. Upon depressing of the key 2, a flowchart of FIG. 3 is called, whereby the cassette tape is rewinded and the front of the recorded message is seeked (step 1). Then, the display 10 shows an message "INPUT PASSCODE" to the operator (step 2) and the cassette tape 11 is brought into the recording condition (step 3). When the operator confirms the "INPUT PASSCODE" message, the operator inputs the passcode of for example of three digits. The passcode is recorded onto the front portion 11a of the tape 11 upon the passcode input operation by the operator, as shown in FIG. 6. The passcode may be recorded in the form of DTMF (Dual Tone Mixed Frequency) signal.

When the input of the predetermined passcode is completed (step 4), the message recorded on the tape 11 after the passcode is deleted (step 5). Thus, the step 5 eliminates a possibility that the message which has been recorded before the change of the passcode will leak. The step 5 may not be necessary when the passcode is input to a new tape.

Figure 4:
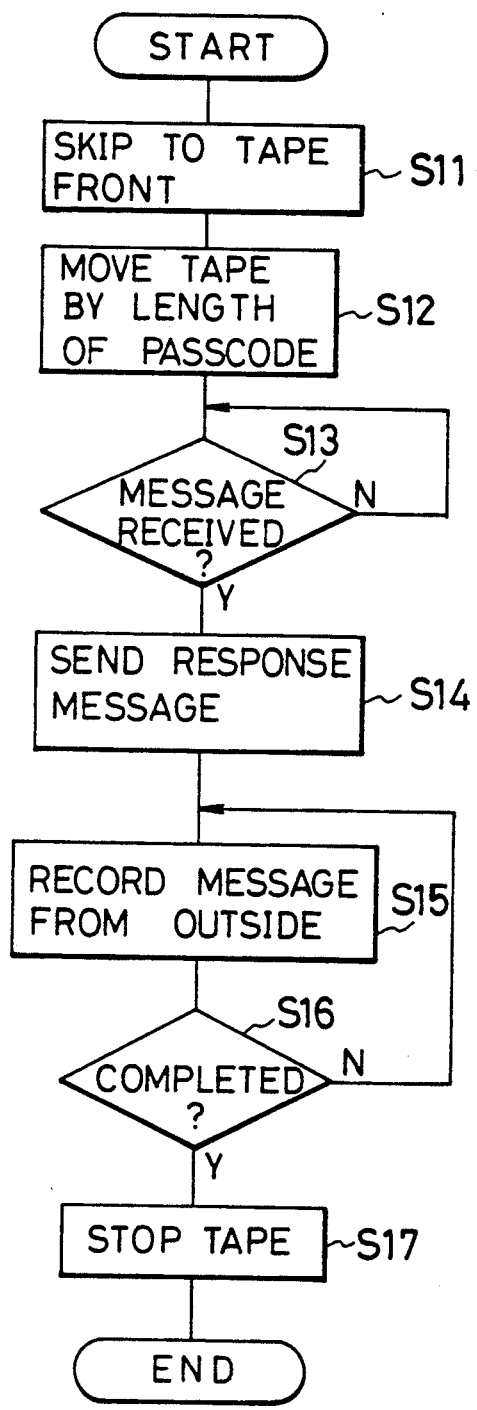

The answering function setting key 4 is depressed in order to set the answering machine arrangement into an answering mdoe after setting the passcode. The flowchart of FIG. 4 is called upon pressing the key 4. At the step 11, the skipping-to-the-tape-front-function is performed. At the step 12, the tape is moved front by a length of the passcode recorded on the tape. Then, the tape is stopped and waits for a message to come, i.e., the tape stands ready for recording. When there is a call from outside through the telephone line L1 (step 13), the response tape is activated to send a previously recorded message to a calling person (step 14). Then, the cassette tape 11 is activated to record the voice of the calling person (step 15). When the calling person finishes talking and cuts the telephone line, or when a predetermined period of time elapses (step 16), the cassette tape 11 is stopped (step 17).

Figure 5:
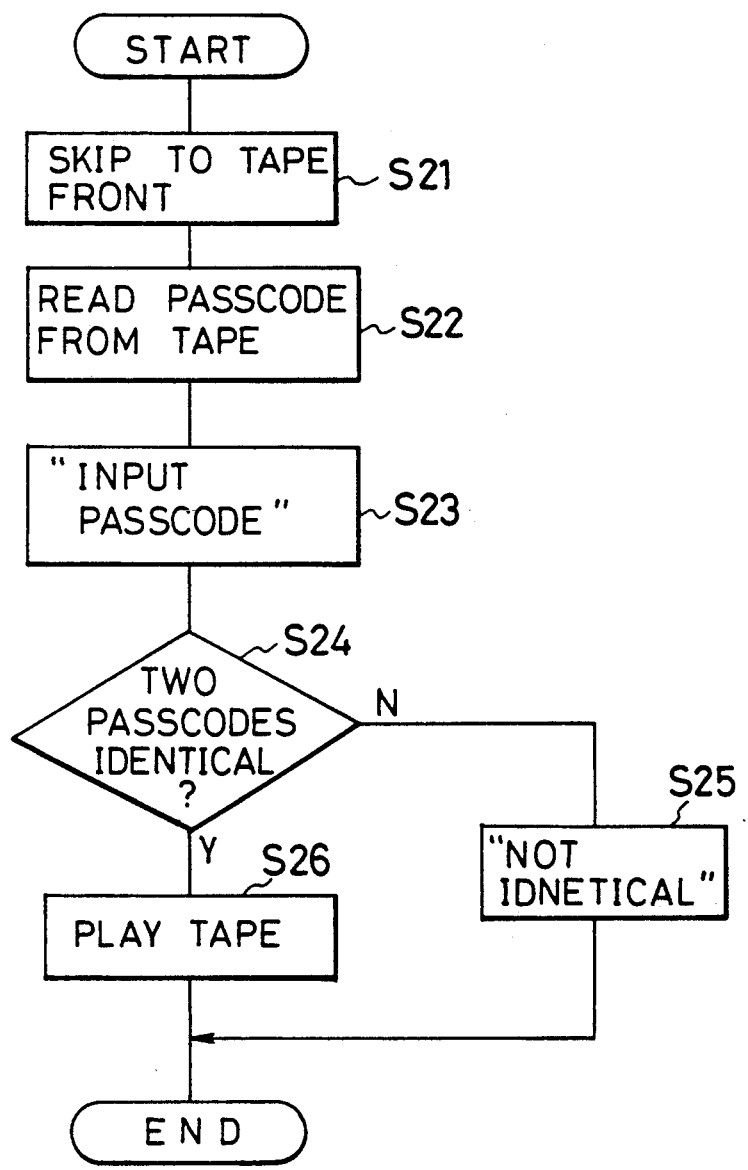

The operator presses the tape-play-back-key 3 if he wants to hear the recorded voice. The flowchart of FIG. 5 is called upon pressing the key 3. FIG. 4 is called upon pressing the key 4. The skipping-to-the-tape-front-function is performed at the step 21. After the step 21, the passcode recorded on the front portion of the tape 11 is read out at the step 22. Then, the display 10 shows the operator the message "INPUT PASSCODE" at the step 23. When the operator inputs the passcode, it is judged if the input passcode is identical to the read out passcode at the step 24. If two passcodes are not the same, the display 10 indicates so at the step 25 and the message recorded on the tape is not informed to the operator. On the other hand, if two passcodes are identical to each other, the tape is moved to play-back the message recorded on the tape and the message is played back through the speaker 17.

We claim:

1. An answering machine arrangement having a play back mode and keys for inputting a passcode, wherein the arrangement comprises:
    a medium for recording a message and a passcode on predetermined recording areas of the recording medium,
    reading means for reading the passcode from the recording medium only when a play back mode is selected,
    determining means for determining whether the passcode read from the recording medium corresponds to a passcode input by manipulating the keys of the arrangement, whereby the message is played back when the passcode recorded on the recording medium and the passcode input by the operator correspond,
    recording means for recording a new passcode,
    verifying means for verifying that the new passcode has been recorded; and
    erasing means for erasing messages stored on the recording medium upon verification that a new passcode has been recorded.

2. An answering machine arrangement having a play back mode, the arrangement comprising:
    a recording medium for recording a passcode and a message, the message being recorded after the passcode;
    reading means for reading the passcode from the recording medium when the play back mode is selected;
    input means for allowing an operator to input a passcode;
    determining means for determining if the passcode read from the recording medium corresponds to the passcode input by the operator;
    playback means for playing back the message recorded in the recording medium when the passcode read from the recording medium and the passcode input by the operator correspond; and
    recording means for recording a new passcode,
    verifying means for verifying that the new passcode has been recorded; and
    erasing means for erasing messages stored on the recording medium upon verification that a new passcode has been recorded.

3. The arrangement of claim 2, further comprising indicating means for indicating that the arrangement is ready for a passcode to be input.

4. The arrangement of claim 2, further comprising indicating means for indicating that the passcode read from the recording medium and the passcode input by the operator do not correspond.

5. The arrangement of claim 2, wherein the passcode is recorded on a predetermined area of the recording medium, the arrangement further comprising finding means for finding the predetermined area of the recording medium on which the passcode is recorded.

6. The arrangement of claim 2, wherein the recording medium comprises a cassette tape.

7. A method of playing back a message recorded in a recording medium, using an arrangement having a play back mode, the method comprising the steps of:
    (A) recording a passcode on a predetermined area of the recording medium;
    (B) allowing the arrangement to record the message on the recording medium after the passcode has been recorded;
    (C) reading the passcode from the recording medium when the play back mode is selected;
    (D) determining if the passcode read from the recording medium corresponds to a passcode input by an operator;
    (E) playing back the message recorded on the recording medium when the passcode read from the recording medium and the passcode input by the operator correspond;
    (F) recording a new passcode on the predetermined area of the recording medium;
    (G) verifying that a new passcode has been recorded onto the predetermined area of the recording medium; and
    (H) erasing messages recorded on the recording medium upon verification that a new passcode has been recorded.

8. The method of claim 7, further comprising the step of finding the predetermined area on which the passcode is recorded, before the step allowing the arrangement to record the message.

9. The method of claim 7, wherein the predetermined area is an empty area, the method further comprising the step of finding the empty area prior to the step of recording the first passcode.

10. The arrangement of claim 1, further comprising a line controller for connecting the arrangement to a telephone line.

* * * * *